United States Patent
Song et al.

(10) Patent No.: US 8,983,746 B1
(45) Date of Patent: Mar. 17, 2015

(54) METHOD FOR DETERMINING DRY DUAL CLUTCH TRANSMISSION TEMPERATURES FOLLOWING OFFLINE PERIODS

(71) Applicant: GM Global Technology Operations LLC, Detroit, MI (US)

(72) Inventors: Xingyong Song, Sterling Heights, MI (US); Kumaraswamy V. Hebbale, Troy, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/051,615

(22) Filed: Oct. 11, 2013

(51) Int. Cl.
*G06F 7/00* (2006.01)
*F16D 48/06* (2006.01)

(52) U.S. Cl.
CPC .................................. *F16D 48/06* (2013.01)
USPC .................................. 701/68; 701/51; 701/22

(58) Field of Classification Search
CPC ............ F16H 61/688; F16H 2059/725; F16D 2021/0607; F16D 2500/30404; F16D 2500/30405; F16D 2500/3122
See application file for complete search history.

(56) References Cited

U.S. PATENT DOCUMENTS

| | | | | |
|---|---|---|---|---|
| 8,062,178 B2 * | 11/2011 | Avny et al. | ...................... | 477/98 |
| 8,224,537 B2 * | 7/2012 | Olsson et al. | .................... | 701/51 |
| 8,700,352 B2 * | 4/2014 | Hebbale et al. | ............... | 702/130 |
| 8,862,354 B2 * | 10/2014 | Hebbale et al. | ................. | 701/68 |
| 2012/0123635 A1 * | 5/2012 | Brevick et al. | ................... | 701/36 |
| 2012/0290249 A1 * | 11/2012 | Hebbale et al. | ............... | 702/130 |

* cited by examiner

*Primary Examiner* — David D Le
(74) *Attorney, Agent, or Firm* — Quinn Law Group, PLLC

(57) ABSTRACT

A method of modeling initial temperatures of a dry DCT includes reactivating a controller after a time lapse between first and second clock times representing an offline period. The last known temperatures of a first component and a second component are read and a first temperature difference therebetween is calculated. The method calculates a stop time and a start time on a predefined exponential function from the calculated temperature difference. A first conductive heat transfer between the first and second components is calculated by integrating the predefined exponential function between the stop time and the start time. Based upon the calculated first conductive heat transfer, a first conductive temperature change between the first and second components is calculated. A starting temperature of the first component is calculated from first conductive temperature change, and a control action on the dry DCT is executed based upon the calculated starting temperature.

10 Claims, 3 Drawing Sheets

METHOD FOR DETERMINING DRY DUAL CLUTCH TRANSMISSION TEMPERATURES FOLLOWING OFFLINE PERIODS

TECHNICAL FIELD

This disclosure relates to thermal modeling for determining clutch temperatures in dry dual clutch transmissions.

BACKGROUND

Motorized vehicles use dual clutch transmissions to combine some of the features of both manual and automatic transmissions. Dual clutch transmissions use two clutches to shift between sets of gears within the same transmission, operating with some of the characteristics of both manual and conventional automatic transmissions. Some dual clutch transmissions use oil-bathed wet multi-plate clutches, and some use dry clutches without oil or fluid.

SUMMARY

A method of modeling initial temperatures of a dry dual clutch transmission is provided. The temperatures are modeled following an offline period of a controller lasting from a first clock time to a second clock time. The method is executed by a controller, which may include a transmission control module (TCM), includes reactivating the controller at the second clock time and calculating a time lapse of the offline period between the first clock time and the second clock time.

The method includes reading last known temperatures of a first component and a second component, wherein the respective last known temperatures occurred at, or just prior to, the first clock time. The method also includes calculating a first temperature difference between the last known temperature of the first component and the last known temperature of the second component.

The method also includes loading a first predefined exponential function, which relates temperature differences between the first component and the second component as a function of time. From the calculated temperature difference, the method calculates a first stop time on the first predefined exponential function. The first stop time normalizes or locates the first clock time relative to the first predefined exponential function.

The method also includes calculating a first start time on the first predefined exponential function from the calculated time lapse and the determined first stop time. The first start time normalizes or locates the second clock time relative to the first predefined exponential function.

The method also includes calculating a first conductive heat transfer between the first component and the second component. Calculating the first conductive heat transfer includes integrating the first predefined exponential function between the first stop time and the first start time. Based upon the calculated first conductive heat transfer, a first conductive temperature change between the first component and the second component is calculated.

The method further includes calculating a starting temperature of the first component from the calculated first conductive temperature change. The method may execute a control action over the dry dual clutch transmission based upon the calculated starting temperature of the first component.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
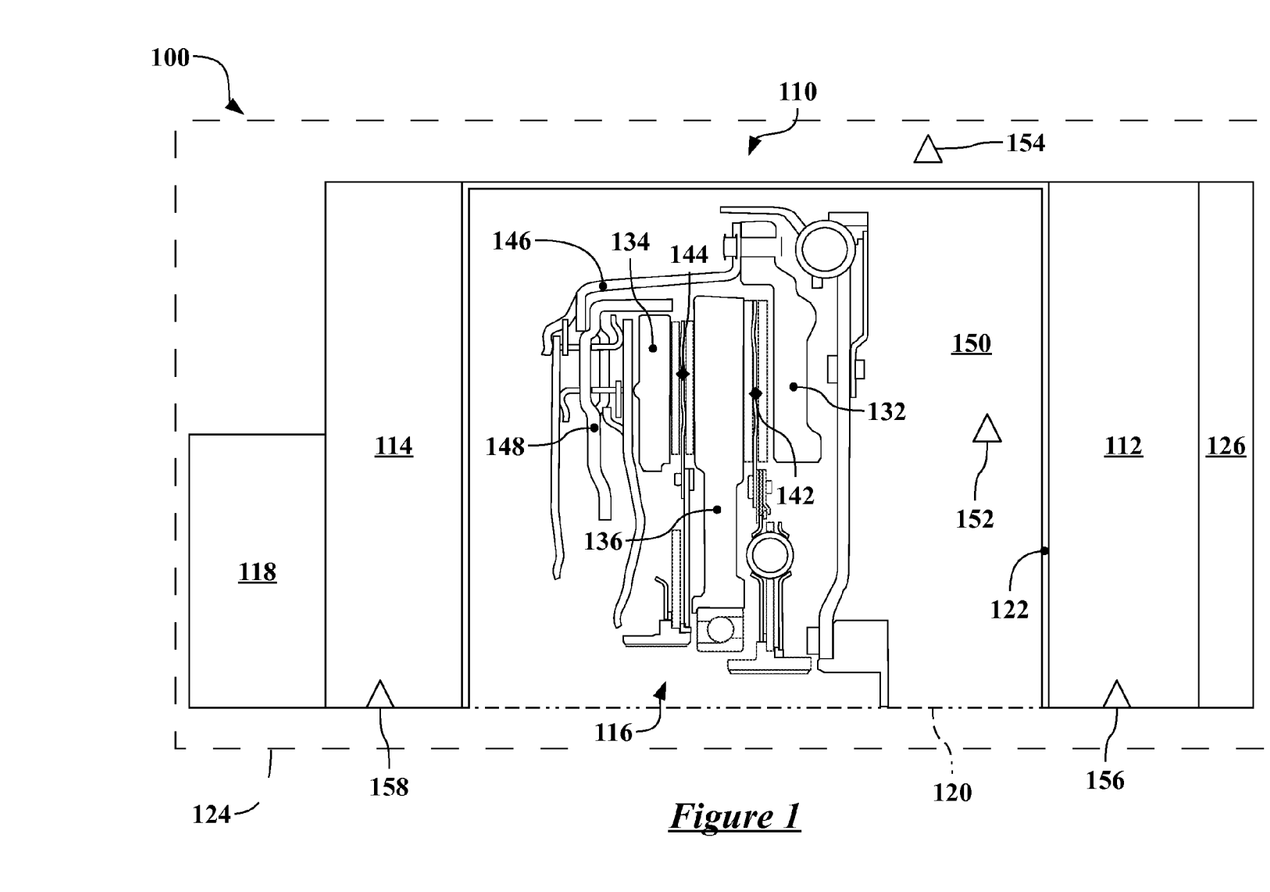
FIG. 1 is a schematic, plane intersection diagram of a powertrain having an illustrative dry dual clutch transmission usable with thermal models described herein.

Referring to the drawings, wherein like reference numbers correspond to like or similar components whenever possible throughout the several figures, there is shown in FIG. 1 a schematic diagram of a powertrain 100. The powertrain 100 may be incorporated into a hybrid vehicle (not shown) or a conventional vehicle (not shown). Features, components, or methods shown or described in other figures may be incorporated and used with those shown in FIG. 1.

While the present invention may be described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The powertrain 100 includes a dry dual clutch transmission (DCT) 110, which may be referred to herein as the dry DCT 110 and receives power from an internal combustion engine 112. The dry DCT 110 includes a transmission gearbox 114 and dual clutch mechanism 116. The engine 112 is drivingly connected for powerflow communication with the dry DCT 110. The dual clutch mechanism 116 selectively allows torque transfer between the engine 112 and the gearbox 114 to facilitate transitions between different gears established by the gearbox 114. The dual clutch mechanism 116 may often be referred to as a dry DCT, as it is the dual clutch mechanism 116 that differentiates the dry DCT 110 from other transmissions.

The gearbox 114 is operatively connected to a final drive 118 (or driveline). The final drive 118 is shown schematically and may include a front or rear differential, or other torque-transmitting mechanism, which eventually provides torque output to one or more wheels (not shown). The final drive 118 may include any known configuration, including front-wheel drive (FWD), rear-wheel drive (RWD), four-wheel drive (4WD), or all-wheel drive (AWD), without altering the description herein.

Only a portion of the powertrain 100 is illustrated in FIG. 1 and the components or assemblies thereof are shown schematically. The lower half (as viewed in FIG. 1) of the powertrain 100 is below a central axis 120, but may be substantially similar to the portions shown. The transfer shafts between the dual clutch mechanism 116 and the engine 112 and gearbox 114 are not shown in FIG. 1. The dual clutch mechanism 116 is housed in a bell housing, housing skin, or bell housing case 122.

The dry DCT 110, and the dual clutch mechanism 116, may be controlled and monitored by a control system or controller 124. The controller 124 may include one or more components with a storage medium having a suitable amount of tangible, non-transitory programmable memory. The controller 124 is capable of storing and executing one or more algorithms or methods to effect control of, or monitor, the dry DCT 110, the powertrain 100, or other components. Each component of the controller 124 may include distributed controller architecture, such as a microprocessor-based electronic control unit (ECU). Additional modules or processors may be present within the controller 124. The controller 124 may alternatively be referred to as a transmission control processor (TCM).

In addition to the engine 112, the powertrain may include additional tracking or propulsion components. For example, one or more electric machines 126, such as an electric motor or motor/generator, may be configured to provide torque and power that is transmitted to the final drive 118. The location of the electric machine 126 shown in FIG. 1 is illustrative only. One or more electric machines 126 may be, for example and without limitation: normalized between the engine 112 and the dual clutch mechanism 116, incorporated into the transmission gearbox 114, or normalized at one or more wheels of the vehicle.

The dual clutch mechanism 116 includes a first clutch 132, which may be referred to as clutch one (C1), and a second clutch 134, which may be referred to as clutch two (C2). A center plate 136 (CP) is between the first clutch 132 and the second clutch 134. Each of the first clutch 132 and the second clutch 134 includes friction discs, friction plates, or other friction materials. The center plate 136 contains corresponding friction plates.

The dual clutch mechanism 116 has a first friction interface 142 at the friction plates between the first clutch 132 and the center plate 136. When the dual clutch mechanism 116 is allowing slip (relative difference in rotational speed) and transferring torque between the first clutch 132 and the center plate 136, the first friction interface 142 generates heat. The dual clutch mechanism 116 also has a second friction interface 144 at the friction plates between the second clutch 134 and the center plate 136. When the dual clutch mechanism 116 is allowing slip and transferring torque between the second clutch 134 and the center plate 136, the second friction interface 144 generates heat.

A first pull cover 146 and a second pull cover 148 (PC1 and PC2, respectively) are operatively connected to the first clutch 132 and the second clutch 134. The first pull cover 146 and the second pull cover 148 are used to actuate torque transfer between the first clutch 132 and the center plate 136 and between the second clutch 134 and the center plate 136 in order to selectively control power transfer to the gearbox 114.

The dual clutch mechanism 116 operates, in very general terms, by selectively engaging the first clutch 132 and the second clutch 134 to alter the output path to the gearbox 114. For example, and without limitation, the first clutch 132 may be engaged for odd-numbered gears (first, third, fifth, etc.) and the second clutch 134 may be engaged for the even-numbered gears (second, fourth, sixth, etc.).

The dual clutch mechanism 116 allows quick power transfer (or handoff) between the first clutch 132 and the second clutch 134 with substantially uninterrupted power transfer to the gearbox 114. Slipping engagement of the first clutch 132 and the second clutch 134 may facilitate handoff between the clutches or control over vehicle launches where neither clutch is initially engaged.

In operation, the pressure or force required for full engagement and for slipping engagement varies based upon the coefficient of friction at the first friction interface 142 and the second friction interface 144, and the coefficient of friction varies based upon the temperature of the first friction interface 142 and the second friction interface 144. Therefore, the controller 124 may vary the pressure applied to the first clutch 132 and the second clutch 134 based upon the temperatures thereof. Note that even though the dual clutch mechanism 116 is dry, such that the first friction interface 142 and the second friction interface 144 are not bathed or submerged in fluid, the first pull cover 146 and the second pull cover 148 may be actuated by fluid pressure, such that the clutch apply pressure is varied as a result of fluid pressure.

The abbreviated or shorthand component names—e.g., PC1 for the first pull cover 146 or CP for the center plate 136—will be used in formulas and equations expressed herein. Furthermore, the abbreviated component names will be used to denote states or values relative to those components—e.g., $T_{C1}$ is the temperature of the first clutch 132. However, note that the terms are interchangeable and the component names are illustrative only.

The interior chamber of the bell housing case 122 is filled with housing air 150. Depending upon the configuration of the dual clutch mechanism 116 and the thermal model applied used to determine temperatures of the dual clutch mechanism 116, the powertrain 100 may include a housing air sensor 152.

The housing air sensor 152 measures the temperature of air within the bell housing case 122. The powertrain may also include an ambient air sensor 154, an engine coolant sensor 156, and a gearbox oil sensor 158. As used herein, ambient air refers to the air just outside of the bell housing case 122. The temperature measurements from these sensors may be used in thermal models to determine the temperatures of the components of the dual clutch mechanism 116.

When either the first clutch 132 or the second clutch 134 is applied, the apply force pushes the corresponding pressure plate of the first clutch 132 or the second clutch 134, squeezing the friction discs against the center plate 136. The dual clutch mechanism 116 is encased in the bell housing case 122, which is assembled between the engine 112 and the gearbox 114. The first clutch 132, the second clutch 134, the center plate 136, the first pull cover 146, and the second pull cover 148 are all masses that conduct heat, and each mass in the system is represented by a single temperature state.

The bell housing case 122 has no forced cooling and has no vents. The heat from the masses is transferred by convection to the housing air 150 and from the housing air 150 to the mass of the bell housing case 122. Heat is then convected from the bell housing case 122 to the ambient air just outside of the bell housing case 122.

There is also heat transfer between the bell housing case 122 and the engine 112 the gearbox 114. However, it can be assumed that heat from the masses is transferred only to bell housing air 150. Furthermore, for purposes of convective transfer from the components (masses) of the dual clutch mechanism 116, it can be assumed that the bell housing case 122 is the same temperature as the bell housing air 150.

In the dual clutch mechanism 116, there is a critical temperature of the friction surfaces that carry torque for the first clutch 132 and the second clutch 134. Above this temperature, the components may start to suffer permanent damage. Furthermore, the clutch friction characteristics—i.e., the coefficient of friction and the torque carrying capacity of the first clutch 132 and the second clutch 134—are a function of the temperatures of the first friction interface 142 and the second friction interface 144. The controller 124 may tap into one or more sensors, including those shown in FIG. 1 and others, to directly measure the temperatures of the components of the dry DCT 110. However, these measurements may only be taken or recorded while the controller 124 is online.

The controller 124 operates only while online. Generally, the controller 124 is online while the propulsion systems of the powertrain 100 are active. In a conventional vehicle, for example, the controller 124 may be online only when the engine 112 is operating. However, in powertrains 100 equipped with start/stop capabilities, the controller 124 may remain online even though the engine 112 is temporarily deactivated while the vehicle is stopped. Similarly, during deceleration fuel cut-off (DFCO) events, the engine 112 is not producing power but the controller 124 may stay online.

In hybrid or electric vehicles, the propulsion systems may be active for long periods during which the engine 112 is inactive, if there is an internal combustion engine. The controller 124 may be online whenever the vehicle key is in the ignition and turned to the running position, or may be online whenever a start button is pushed: as both of these situations would suggest that the operator intends to drive the vehicle and the propulsion systems would be made active.

By contrast, when the vehicle is shut off and parked, such that the propulsion systems are inactive, the controller 124 is offline. During these offline periods, the controller 124 is not reading or estimating temperatures of the components of the dry DCT 110.

In many configurations of the dry DCT 110, it may be difficult to place temperature sensors directly on the first clutch 132 and the second clutch 134. It may be impossible to place a temperature sensor near the first friction interface 142 and the second friction interface 144 of the dual clutch mechanism 116. Therefore, the controller 124 may use a thermal model to determine the temperatures components—including the first clutch 132 and the second clutch 134—to estimate the torque capacity at the first friction interface 142 and the second friction interface 144, and also to provide driver warnings to prevent misuse of the dry DCT 110.

In many cases, including the five and seven-state models discussed, the thermal models are sufficient to determine changes in temperature during operation of the dry DCT 110 while the controller 124 is online. However, while the controller 124 is not online, such as during periods in which the powertrain 100 is not operational and the propulsion systems are inactive, the temperatures are unknown. Furthermore, the online thermal models may only determine temperature changes, and therefore need accurate starting temperatures to which the temperature changes may be added or subtracted.

Where temperature sensors cannot be used to determine the temperatures of every component of the dry DCT 110, the controller 124 uses one or more online thermal models to determine the un-sensed temperatures. These online thermal models take known information—such as from the included sensors, operating conditions of the engine 112, and slipping events in dual clutch mechanism 116—to determine the remaining temperatures through thermodynamics.

For example, a seven-state or a five-state online thermal model may be used. The seven-state thermal model determines the temperatures of the first clutch 132 and the second clutch 134 for the dry DCT 110. However, in some configurations, a simplified, five-state thermal model is used instead. The five-state thermal model requires lower computational throughput.

When the seven-state thermal model is used, the states (or temperatures) are calculated at: the first clutch 132, the second clutch 134, the center plate 136, the first pull cover 146, the second pull cover 148, the bell housing case 122, and the housing air 150. When the simplified, five-state thermal model is used, the states are reduced to: the first clutch 132, the second clutch 134, the center plate 136, the first pull cover 146, and the second pull cover 148. The five-state thermal model may be used when the temperature of the housing air 150 is known, such as from the inclusion of the housing air sensor 152.

Illustrative seven-state and five-state thermal models are described in U.S. patent application Ser. No. 13/104,102, filed May 10, 2011, the complete disclosure of which is incorporated herein by reference. However, other thermal models or sensor arrangements may be used to determine temperatures while the controller 124 is online. The last-known temperatures—from just prior to the controller 124 being taken offline—may be taken as givens to the offline thermal model for determining starting temperatures, as described herein.

Figure 2A:
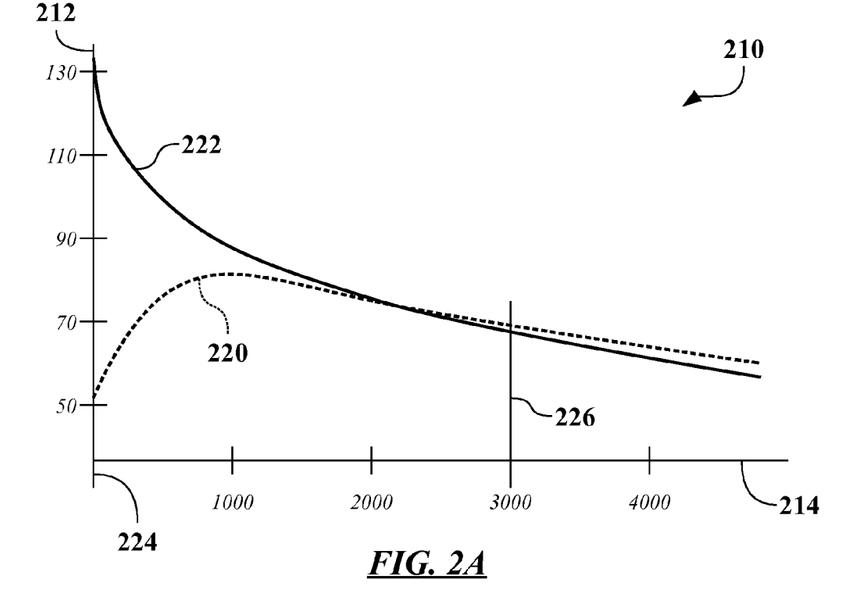
FIG. 2A shows a schematic chart or graph that broadly illustrates testing, validation, and implementation of an offline thermal model applied to a dry dual clutch transmission, such as that shown in FIG. 1.
Figure 2B:
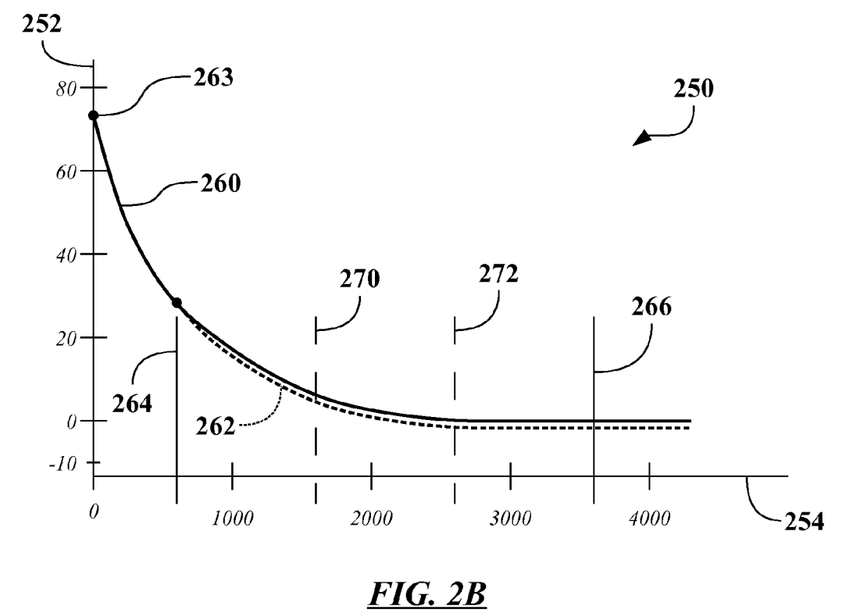
FIG. 2B shows a schematic chart or graph that broadly illustrates testing, validation, and implementation of the offline thermal model applied to a dry dual clutch transmission, such as that shown in FIG. 1.

Referring now to FIG. 2A and FIG. 2B, and with continued reference to FIG. 1, there are shown schematic charts or graphs that broadly illustrate testing of the dry DCT 110, determination of coefficients, and validation of the thermal models described herein. FIG. 2A shows test data of temperature differences during a representative offline period of the controller 124. FIG. 2B shows an exponential function used to simulate temperature differentials along a time scale.

In the test data shown in FIG. 2A, the temperatures of the second clutch 134 (C2) and the center plate 136 (CP) were measured in an experimental setting by temperature sensors. FIG. 2A represents actual or simulated temperatures following deactivation of the propulsion systems of the powertrain 100 and of the controller 124. Therefore, FIG. 2A represents the period during which the controller 124 is offline and, when the dry DCT 110 is implemented in real world vehicles, the temperatures of the second clutch 134 and the center plate 136 are not being determined by any thermal model or active sensors.

A chart 210 shows temperature on a y-axis 212 (which may be illustrating degrees Celsius) and time on an x-axis 214 (which may be illustrating seconds). Note that the values shown on the axes are illustrative only. A measured temperature of the second clutch 134 is shown as a C2 line 220 and a measured temperature of the center plate 136 is shown as a CP line 222.

The measurement begins at a first clock time 224 (which may be abbreviated t1) and ends at a second clock time 226 (which may be abbreviated t2). The first clock time 224 and the second clock time 226 may alternatively be referred to as time stamps. The first clock time 224 represents the beginning of an offline period for the controller 124 and the second clock time 226 represents the end of the offline period for the controller 124.

The controller 124 may have its own clock or may access another clock to these clock times. The second clock time 226 may be noted or determined immediately at initialization or reactivation of the controller 124.

A time lapse, $\Delta t$, may be calculated between the second clock time 226 and the first clock time 224, such that $t2-t1=\Delta t$. The time lapse may also be referred to as the offline period, as the controller 124 is offline between t1 and t2. For example, if the vehicle is shut down and the controller 124 taken offline at 12:05 PM and then turned on and the controller comes online at 12:58 PM; the first clock time 224 would be 12:05 PM, the second clock time 226 would be 12:58 PM, and the time lapse would be 53 minutes or 3,180 seconds.

FIG. 2B shows simulated temperature differentials (ΔT) between the second clutch 134 and the center plate 136 during offline periods of the controller 124. A predefined exponential function is used to create FIG. 2B based upon experimental measurements of actual temperatures of the second clutch 134 and the center plate 136, such as that shown in FIG. 1.

As shown in FIG. 2B, the predefined exponential function described herein closely predicts the temperature differentials between the second clutch 134 and the center plate 136 during the offline period of the controller 124. A chart 250 shows the temperature differentials on a y-axis 252 and time on an x-axis 254. Note that the values shown on the axes are illustrative only.

A simulated temperature differential 260 between the second clutch 134 and the center plate 136 is shown as a solid line. The simulated temperature differential 260 is a graphical representation of the predefined exponential function. A measured temperature differential 262 between the second clutch 134 and the center plate 136 is shown as a dashed line. The temperature differential at time t=0 is shown at point 263. Note that the time scale of the x-axis 254 is also predefined, and does not directly relate to actual offline periods of the controller 124, such that time t=0 in FIG. 2B is not necessarily the beginning of the offline period. Therefore, the controller 124, using methods described herein, will locate or normalize offline periods onto the predefined exponential function.

The measured temperature differential 262 corresponds to the differentials between the C2 line 220 and the CP line 222 shown in FIG. 2A. The measured temperature differential 262, once normalized relative to the predefined exponential function, demonstrates that the offline thermal model accurately predicts the temperature differentials.

The general governing equation describing the heat balance for any individual component A is given by the following.

$$\text{Mass}_A \times Cp_A \times DT_A = Q_A \tag{A1}$$

Where $\text{Mass}_A$ and $Cp_A$ are the mass and specific heat of the component A of the dual clutch mechanism 116 under consideration; $Q_A$ represents the heat input and heat output for the mass, respectively; and $DT_A$ is the change in temperature caused by the heat transfer to or from the component A. As used herein, component A and component B are generically representative of any two components of the dual clutch mechanism 116.

Note that the physical characteristic specific heat is denoted as Cp and the center plate 136 is abbreviated as CP. Furthermore, temperature changes caused or driven by heat transfer are denoted by DT, while temperature differences between two components (generally occurring at the same time) are denoted ΔT.

Some of the inputs, values, and physical properties of the heating equations may be determined through inspection, reference tables, or CAD models. However others may be determined through data optimization by comparing testing data of the dual clutch mechanism 16 with pre-optimized simulations. The data is optimized by comparing the simulations with the test data, and the five-state thermal model is developed with more-precise inputs and values for the actual dual clutch mechanism 116 used.

Similarly, conductive heat transfer between the component A and any other component B, having a conductive connection or path, may be found by the following.

$$Q_{A\_B}^{conduction} = DT_{A\_B}^{conduction} \times CP_A \times \text{Mass}_A \tag{A2}$$

For example, as shown in FIGS. 2A and 2B, conduction occurs between the second clutch 134 and the center plate 136, which could be components A and B above. A predefined (or simulated) exponential function, such as that shown in FIG. 2B, relates time and temperature differential between components A and B based upon the following equation.

$$\Delta T_{AB}(t) = \text{bexp}_{AB} e^{E_{AB}(t)} \tag{A3}$$

Because the predefined exponential function is simulated, it has its own time scale.

The exponential multiplier, $\text{bexp}_{A\_B}$, is determined from curve-fitting experimental data based upon testing actual temperatures of components during offline periods. For example, and without limitation, either nonlinear or linear optimization processes to find the specific predefined exponential curves for temperature differential between any two components A and B. The exponential multiplier for components A and B is the baseline (at time t=0 along the predefined exponential function time scale) and may also be expressed by the following equation.

$$\text{bexp}_{AB} = \Delta T_{AB}(0) \tag{A4}$$

An illustration of the exponential multiplier or exponential baseline between the second clutch 134 and the center plate 136 (i.e., $\text{bexp}_{C2\_CP}$) is shown in FIG. 2B at point 263. Note that exponential functions may be expressed herein by either $\exp(E_{AB})$ or $e^\wedge(E_{AB})$.

Similarly, the exponential coefficient, $E_{AB}$, may also be determined from curve fitting techniques. However, the exponential coefficient may also be determined from physical characteristics of the two components A and B, and shown in the following equation.

$$E_{AB} = -\left[\frac{cond \times AreabydxAB}{Cp_A \times \text{Mass}_A} + \frac{cond \times AreabydxAB}{Cp_B \times \text{Mass}_B}\right] \tag{A5}$$

Note that the exponential coefficient, $E_{AB}$, is specific to the components experiencing conductive heat transfer (in this example, generic components A and B).

From the exponential relationship between the temperature differential (ΔT) and time (t), a stop time, which may be abbreviated tstop, can be determined relative to the predefined exponential function. By determining the stop time, the first time is normalized or placed on the predefined exponential function. The stop time is illustrated in FIG. 2B at reference line 264, and may be determined from the following equation.

$$tstop = \frac{1}{E_{AB}} \ln \frac{\Delta T_{A\_B}}{\text{bexp}_{AB}} \tag{A6}$$

Therefore, the stop time represents the location, relative to the exponential function, at which the controller 124 went offline. The stop time shifts the time lapse of the actual offline period onto the time scale of the predefined exponential function.

After determining the stop time, the time lapse (Δt) between the first clock time 224 and the second clock time 226 may be used to determine a start time, which may be abbreviated tstart. The start time represents the location on the predefined exponential function when the controller 124 went back online, such that tstart=tstop+Δt. The start time is illustrated in FIG. 2B at reference line 266.

The generic equations applied to component A and component B may also be applied and modified with the specific components and relationships of the dual clutch mechanism 116 shown in FIG. 1. These specific-component equations, which take account of conduction and convection, form the offline thermal model. The equations for each component may be used to determine the temperatures of each component within the dual clutch mechanism 116 at startup of the powertrain 100 and initialization of the controller 124 at the second clock time (t2).

Equations that may be used by the controller 124 to calculate starting temperatures for the second clutch 134 will now be described. With the second clutch 134, there is only one conduction path, which is between the second clutch 134 and the center plate 136. The controller 124 also uses the offline thermal model to calculate convection between the second clutch 134 and the housing air 150.

When the controller 124 comes online at the second clock time, the temperature of the second clutch 134 may be calculated by the following equation.

$$T_{C2}(t2) = T_{C2}(t1) + DT_{C2}^{convection}(t1) + DT_{C2(CP\_C2)}^{conduction} \quad (B1)$$

Where $T_{C2}(t2)$ is the temperature of the second clutch 134 at the second clock time, and $T_{C2}(t1)$ is the temperature of the second clutch 134 at the first clock time. The convection term, $DT_{C2}^{convection}(t1)$, is the temperature change due to convection into the housing air 150. The conduction term, $DT_{C2(CP\_C2)}^{conduction}(t1)$, is the temperature change due to heat transfer from the center plate 136 to the second clutch 134 through conduction.

The temperature changes caused by convective and conductive heat transfer may be split and separately calculated or separately identified as a convection term and one or more conduction terms. In the example shown below, the convection term incorporates the last known temperature of the second clutch 134, but the last known temperature may also be separated. The convection term may be calculated by the following equation.

$$T_{C2}(t1) + DT_{C2}^{convection}(t1) = (T_{C2}(t1) - T_{case}(t1)) \times \exp(-b_{C2} \times \Delta t) + T_{case}(t1) \quad (B2)$$

When calculating the convection term, the offline thermal model assumes that the temperature of the housing air 150 and the bell housing case 122 are equivalent. The temperature differential between the bell housing case 122 and the second clutch 134 drives the convective heat transfer from the second clutch 134 throughout the offline period of the controller 124 (incorporated in the equations by the time lapse, $\Delta t$).

The convective exponential coefficient, $b_{C2}$, and a heat transfer coefficient, $h_{C2}$, used therein, may be found by the following equations.

$$b_{C2} = h_{C2} \times A_{C2}/(Cp_{C2} \times \text{Mass}_{C2}) \quad (B3)$$

$$h_{C2} = f[T_{C2}(t1) - T_{case}(t1)] \quad (B4)$$

Where $Cp_{C2}$ is the specific heat coefficient and $\text{Mass}_{C2}$ is the mass of the second clutch 134. The function, f, determining the heat transfer coefficient, $h_{C2}$, is calibrated using the nonlinear optimization approach, and may be embodied as a look-up function or lookup table.

The temperature change caused by conductive heat transfer between the center plate 136 and the second clutch 134 is calculated by integrating the predefined exponential function between the stop time and the start time. This integration covers the total temperature difference, which drives heat transfer between the components. The conduction term, which is the temperature change caused by conductive heat transfer, may be calculated from the following equation.

$$DT_{C2(CP\_C2)}^{conduction}(t1) = \frac{\int_{tstop}^{tstart} b\exp_{CPC2} e^{[E22^{t1}]} \times cond \times AreabydxCPC2 \times dt}{Cp_{C2} \times \text{Mass}_{C2}} \quad (B5)$$

Where $b\exp_{CPC2}$ is the exponential multiplier, which is the baseline temperature difference of the predefined exponential function (at t=0). The is illustrated as point 263 in FIG. 2B.

The conductivity number, cond, varies based upon the materials from which the components are formed. The conductivity number may be available from a combination of reference sources and modeling or may be found through experimental data collection. The term AreabydxCPC2 is the conducting area divided by the thickness of the conducting section, which may be determined from CAD modeling or investigation based upon the point of contact and shape of the components.

Each of the individual temperature change components above is calculated and summed to find the starting temperature of the second clutch 134. The controller 124 performs this calculation substantially immediately after the offline period ends.

The calculations of the offline thermal model laid out above may be executed by the controller 124 with relatively low computational throughput. Therefore, the starting temperatures of each component may be calculated with very few numerical steps executed by the controller 124.

Note that the offline thermal model is illustrated herein as using a single loop or iteration to determine heat transfer, and the resulting starting temperatures. However, the offline period could be split into multiple iterations, which may improve accuracy of the temperature differential integrations for conductive heat transfer and the calculations of convective heat transfer.

With multiple iterations, the controller 124 may use an iterative period (n) to divide the time lapse ($\Delta t$) and set one or more iterative points (k) between the first clock time (t1) and the second clock time (t2). For example, if the iterative period were half of the time lapse, the equations would calculate heat transfer between the first clock time and the iterative point, and then between the iterative point and the second clock time. Two illustrative iterative points (k1 and k2) are shown in FIG. 2B at reference lines 270 and 272.

Regarding the first clutch 132, there are two conduction paths and one convection path. Conduction occurs between the first clutch 132 and the center plate 136, and conduction also occurs between the first clutch 132 and the first pull cover 146. Furthermore, the offline thermal model calculates convection between the first clutch 132 and the housing air 150.

Many of the equations for determining the starting temperature of the first clutch 132 are similar to those used for the second clutch 134. Therefore, not all subsequent equations will be explained in detail. When the controller 124 comes online at the second clock time, the temperature of the first clutch 132 may be calculated by the following equations.

$$T_{C1}(t2) = T_{C1}(t1) + DT_{C1}^{convection}(t1) - DT_{C1(C1\_PC1)}^{conduction}(t1) + DT_{C1(CP\_C1)}^{conduction}(t1) \quad (C1)$$

$$T_{C1}(t1) + DT_{C1}^{convection}(t1) = (T_{C1}(t1) - T_{case}(t1)) \times \exp(-b_{C1} \times \Delta t) + T_{case}(t1) \quad (C2)$$

$$b_{C1} = h_{C1} \times A_{C1}/(Cp_{C1} \times \text{Mass}_{C1}) \quad (C3)$$

$$h_{C1} = f[T_{C1}(t1) - T_{case}(t1)] \quad (C4)$$

$$DT^{conduction}_{C1(C1\_PC1)}(t1) = \quad \text{(C5)}$$

$$\frac{\int_{tstop}^{tstart} b\exp_{C1PC1} e^{[E_{55}t]} \times cond \times AreabydxC1PC1 \times dt}{Cp_{C1} \times Mass_{C1}}$$

$$DT^{conduction}_{C1(CP\_C1)}(t1) = \quad \text{(C6)}$$

$$\frac{\int_{tstop}^{tstart} b\exp_{CPC1} e^{[E_{11}t]} \times cond \times AreabydxCPC1 \times dt}{Cp_{C1} \times Mass_{C1}}$$

The controller 124 calculates a first conduction term, which is the temperature change caused by conduction between the first clutch 132 and the center plate 136. The controller 124 also calculates a second conduction term for the temperature change caused by conduction between the first clutch 132 and the first pull cover 146. The convection term is substantially identical to the convection term for the first clutch 132 but with physical characteristics and lookup functions based upon the second clutch 134.

Regarding the center plate 136, there are four conduction paths and one convection path. Conduction occurs between the first clutch 132 and the center plate 136, the second clutch 134 and the center plate 136, the first pull cover 146 and the center plate 136, and the second pull cover 148 and the center plate 136. Furthermore, the offline thermal model calculates convection between the center plate 136 and the housing air 150.

The calculations for the convection term are substantially identical to those shown regarding the second clutch 134 and the first clutch 132. Therefore, the equations for the convection term, the convection coefficient, and the heat transfer coefficient are not shown for the center plate 136.

$$T_{CP}(t2)=T_{CP}(t1)+DT_{CP}^{convection}(t1)-$$
$$DT_{CP(CP\_C1)}^{conduction}(t1)-$$
$$DT_{CP(CP\_PC1)}^{conduction}(t1)-$$
$$DT_{CP(CP\_PC2)}^{conduction}(t1)-$$
$$DT_{CP(CP\_C2)}^{conduction}(t1) \quad \text{(D1)}$$

$$DT^{conduction}_{CP(CP\_C1)}(t1) = \quad \text{(D2)}$$

$$\frac{\int_{tstop}^{tstart} b\exp_{CPC1} e^{[E_{11}t]} \times cond \times AreabydxCPC1 \times dt}{Cp_{CP} \times Mass_{CP}}$$

$$DT^{conduction}_{CP(CP\_PT1)}(t1) = \quad \text{(D3)}$$

$$\frac{\int_{tstop}^{tstart} b\exp_{CPPC1} e^{[E_{33}t]} \times cond \times AreabydxCPPC1 \times dt}{Cp_{CP} \times Mass_{CP}}$$

$$DT^{conduction}_{CP(CP\_PC2)}(t1) = \quad \text{(D4)}$$

$$\frac{\int_{tstop}^{tstart} b\exp_{CPPC2} e^{[E_{44}t]} \times cond \times AreabydxCPPC2 \times dt}{Cp_{CP} \times Mass_{CP}}$$

$$DT^{conduction}_{CP(CP\_C2)}(t1) = \quad \text{(D5)}$$

$$\frac{\int_{tstop}^{tstart} b\exp_{CPC2} e^{[E_{22}t]} \times cond \times AreabydxCPC2 \times dt}{Cp_{CP} \times Mass_{CP}}$$

There are four conduction terms for the four different conductive heat paths in connection with the center plate 136. Note that the controller 124 will determine stop times and start times—which are the stop time plus the time lapse—for each of the four conduction terms.

Using conductive transfer between the first clutch 132 and the center plate 136 as an example, note that the predefined exponential functions are the same, regardless of whether the controller is calculating heat transfer from the first clutch 132 to the center plate 136 or from the center plate 136 to the first clutch 132. The temperature differentials are integrated over the same predefined exponential function regardless of the direction of heat flow in the calculation, such that the exponential coefficient ($E_{11}$) and the exponential multiplier (b$\exp_{CPC1}$) are the same.

However, the component-specific physical characteristics ($Cp_{C1}$, $CP_{CP}$, $Mass_{C1}$, $Mass_{CP1}$, etc.) are different. Therefore, the same amount of conductive heat transfer between the first clutch 132 and the center plate 136 will result in different changes to the starting temperatures of the first clutch 132 and the center plate 136 as a result of that conductive heat transfer.

Regarding the first pull cover 146, there are two conduction paths and one convection path. Conduction occurs between the first pull cover 146 and the center plate 136, and the first pull cover 146 and the first clutch 132. Furthermore, the offline thermal model calculates convection between the first pull cover 146 and the housing air 150.

The calculations for the convection term are substantially identical to those shown regarding the second clutch 134 and the first clutch 132. Therefore, the equations for the convection term, the convection coefficient and the heat transfer coefficient are not shown for the first pull cover 146.

$$T_{PC1}(t2)=T_{PC1}(t1)+DT_{PC1}^{convection}(t1)+$$
$$DT_{PC1(CP\_PC1)}^{conduction}(t1)+$$
$$DT_{PC1(C1\_PC1)}^{conduction}(t1) \quad \text{(E1)}$$

$$DT^{conduction}_{PC1(CP\_PC1)}(t1) = \quad \text{(E2)}$$

$$\frac{\int_{tstop}^{tstart} b\exp_{CPPC1} e^{[E_{33}t]} \times cond \times AreabydxCPPC1 \times dt}{Cp_{PC1} \times Mass_{PC1}}$$

$$DT^{conduction}_{PC1(CP\_PC1)}(t1) = \quad \text{(E3)}$$

$$\frac{\int_{tstop}^{tstart} b\exp_{C1PC1} e^{[E_{55}t]} \times cond \times AreabydxCPPC1 \times dt}{Cp_{PC1} \times Mass_{PC1}}$$

Regarding the second pull cover 148, there are two conduction paths and one convection path. Conduction occurs only between the second pull cover 148 and the center plate 136. Furthermore, the offline thermal model calculates convection between the second pull cover 148 and the housing air 150.

The calculations for the convection term are substantially identical to those shown regarding the second clutch 134 and the first clutch 132. Therefore, the equations for the convection term, the convection coefficient and the heat transfer coefficient are not shown for the second pull cover 148.

$$T_{PC2}(t2)=T_{PC2}(t1)+DT_{PC2}^{convection}(t1)+$$
$$DT_{PC2(CP\_PC2)}^{conduction}(t1) \quad \text{(F1)}$$

$$DT^{conduction}_{PC2(CP\_PC2)}(t1) = \quad \text{(F2)}$$

$$\frac{\int_{tstop}^{tstart} b\exp_{CPPC2} e^{[E_{44}(t)]} \times cond \times AreabydxCPPC2 \times dt}{Cp_{PC2} \times Mass_{PC2}}$$

The offline thermal model described above may be best suited to situations in which the first clutch 132 is hotter than the second clutch 134, such that the model primarily described herein may be referred to as a C1-high model. However, some changes may be made to the offline thermal model when the second clutch 134 is hotter than the first clutch 132, such that the controller 124 loads a C2-high model. When both temperatures are similar, such as within ten percent, the controller 124 may default to the C1-high model.

For the C2-high model, the controller 124 may, in some configurations, load different exponential coefficients or exponential multipliers. Furthermore, the controller 124 may add an additional conduction term to the calculation for the second clutch 134.

$$DT_{C2(C2\_PC2)}^{conduction}(t1) = \frac{\int_{tstop}^{tstart} b\exp_{C2PC2} e^{[E_{66}t]} \times cond \times AreabydxC2PC2 \times dt}{Cp_{C2} \times Mass_{C2}} \quad (G)$$

Therefore, in the C2-high model, the controller 124 calculates temperature change based upon conduction between the second clutch 134 and the second pull cover 148, in addition to the center plate 136, as shown above.

Figure 3:
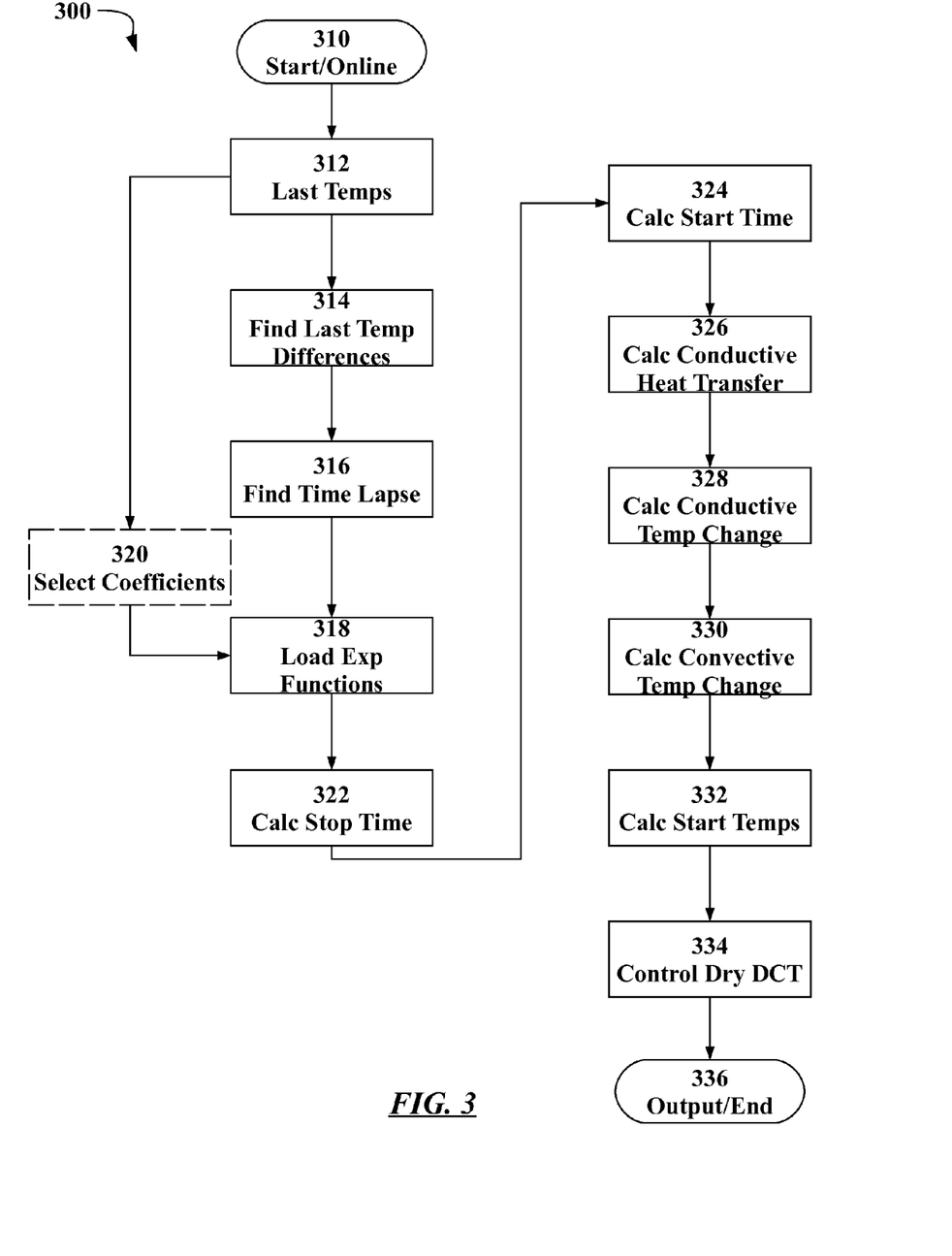
FIG. 3 is a schematic flow chart of a method or algorithm implementing the offline thermal model for determining starting temperatures in a dry dual clutch transmission, such as that shown in FIG. 1.

Referring now to FIG. 3, and with continued reference to FIG. 1, there is shown a schematic flow chart diagram of an algorithm or method 300 for determining clutch temperatures in a dry dual clutch transmission, such as the dry DCT 110 shown in FIG. 1. FIG. 3 shows only a high-level diagram of the method 300. The exact order of the steps of the algorithm or method 300 shown in FIG. 3 is not required. Steps may be reordered, steps may be omitted, and additional steps may be included. Furthermore, the method 300 may be a portion or sub-routine of another algorithm or method.

For illustrative purposes, the method 300 may be described with reference to the elements and components shown and described in relation to FIG. 1 and may be executed by the controller 124. However, other components may be used to practice the method 300 and the invention defined in the appended claims. Any of the steps may be executed by multiple components within the controller 124.

Step 310: Start/Initialize.

The method 300 may begin at a start or initialization step at which time the method 300 becomes operational as the controller 124 comes online. As described herein, the controller 124 may come online in response to the propulsion systems becoming active, such as in response to the ignition key or the start button, or in response to other specific conditions being met. The controller 124—which may be a transmission control module (TCM)—is being activated at the second clock time. Generally, the method 300 may be configured to run only a fixed number of loops or iterations immediately after the controller 124 is placed online, and will then become inactive after providing the starting temperatures for subsequent operation of the dry DCT 110.

The method 300 uses an offline thermal model to calculate the starting temperatures for one or more of the components of the dual clutch mechanism 116 when the controller 124 is initialized following an offline period—during which the controller 124 was not determining temperatures. The description of the method 300 herein will use the second clutch 134 to illustrate how the method 300 executes the offline thermal model. However, the description applies similarly to the remainder of the components and the remainder of the thermal equations described relative thereto.

Step 312: Read Last Known Temperatures.

The method 300 reads the previous temperature states of all components. The previous temperature states existed at, or just prior to, the last operating points of the controller 124. The previous temperature states are stored in non-transitive memory, such as flash memory, and are accessible by the controller 124.

Step 314: Calculate Last Temperature Differences.

The method 300 calculates temperature differences from the last known temperatures. For example, in order the determine the starting temperature of the second clutch 134, the method 300 will determine the temperature differential between the second clutch 134 and the center plate 136.

Step 316: Calculate Time Lapse.

From the first clock time (t1) and the second clock time (t2), the method 300 calculates the time lapse (Δt), where Δt=t2−t1. The method 300 may also calculate any iterative periods.

Step 318: Load Predefined Exponential Functions.

The method 300 loads the predefined exponential functions for the offline thermal model. For example, regarding conduction heat transfer to the second clutch 134, the method 300 loads $\exp(E_{22}t)$.

The method 300 also loads the parameters or coefficients of each relevant component of the dual clutch mechanism 116 for use with the offline thermal model. The parameters include, without limitation: heat transfer coefficients and other characteristics of the specific materials making up the relevant components, and the areas and thicknesses of conduction interfaces between components. For example, when calculating temperature changes for the second clutch 134, the method 300 loads the exponential coefficient $E_{22}$, the area $A_{C2}$, the mass $Mass_{C2}$, the specific heat $Cp_{C2}$, and other necessary parameters for the offline thermal model.

Step 320: Select Exponential Coefficients.

The method 300 may select between different exponential functions by selecting different exponential coefficients ($E_{AB}$), particularly where the method 300 is executing either the C1-high model or the C2-high model. The method 300 may include loading specific coefficients based upon the relative temperatures of the first clutch 132 and the second clutch 134. Note that in the exemplary C2-high model described herein, loading exponential coefficients further includes loading the second conduction term for calculation of temperature change caused by conduction between the second clutch 134 and the second pull cover 148.

Step 322: Calculate Stop Time Relative to Exponential Function.

The method 300 also calculates the stop time (tstop) by locating the first clock time (t1) relative to the predefined exponential function. The temperature differential between the second clutch 134 and the center plate 136 at the first clock time—when the controller 124 went offline—is used to determine the stop time for the conduction term between the second clutch 134 and the center plate 136. Note that where there are additional conduction terms—for example, the center plate 136 has four conduction terms—the method 300 will include determining stop times for each conduction term.

Step 324: Calculate Start Time Relative to Exponential Function.

The method 300 also calculates the start time, which is the time lapse (Δt) added to the stop time. Note that where there are multiple conduction terms—for example, the center plate 136 has four conduction terms—the method 300 will include determining start times for each conduction term.

Step 326: Calculate Conductive Heat Transfer.

With the stop time and the start time, the controller 124 may integrate the temperature differentials driving conductive heat transfer throughout the offline period. The method 300 determines the total conductive heat transfer based upon the integrated temperature differential during the offline period.

Step 328: Calculate Conductive Temperature Change.

From the calculated conductive heat transfer the method 300 determines the temperature change caused by conduction. For the second clutch 134, there is at least one conduction term, which incorporates temperature change caused by conduction from the center plate 136 to the second clutch 134. There may be additional conductive temperature changes when there are additional conduction terms.

Step 330: Calculate Convective Heat Transfer.

The method 300 calculates the convection term from the temperature change caused by convection between the second clutch 134 and the housing air 150. The method 300 may, as shown above, assume that the temperature of the housing air 150 and the bell housing case 122 are substantially identical. The convection term may include the temperature of the second clutch 134 at the first clock time, or the controller 124 may separately handle the last known temperature.

Step 332: Calculate Starting Temperatures.

After determining temperature changes caused by convection and conduction, the method 300 sums the convection term and the one or more conduction terms. The starting temperature of, for example, the second clutch 134 is the last known temperature of the second clutch 134 plus the temperature change caused by convection to the housing air 150 plus the temperature change caused by conduction from the center plate 136.

Note that mathematical signs discussed herein and shown in the formulas above may be reversed in the method 300. Furthermore, when the temperature differentials diving heat transfer necessitate, the resulting signs of the conduction terms may automatically change because heat will flow from high temperature to low temperature regardless of the direction assumed by the offline thermal model executed by the controller 124.

Step 334: Execute Control Action on Dry DCT.

The method 300 uses the starting temperatures to execute one or more control actions on the dry DCT 100 and, particularly, the dual clutch mechanism 116. The control actions may include varying the pressure applied to the first clutch 132 and the second clutch 134 to selectively engage either the first clutch 132 or the second clutch 134, or for slipping engagement of either the first clutch 132 or the second clutch 134.

For example, and without limitation, the starting temperatures may be used by the controller 124 to determine the necessary apply-pressure for the first clutch 132 as the vehicle begins to drive. Furthermore, as the dual clutch mechanism 116 performs subsequent shifts—thereby generating heat—during driving, the starting temperatures are used as the baseline for monitoring or modeling temperature changes in the components of the dual clutch mechanism 116 while the controller 124 is online.

Step 336: End/Loop.

The method 300 may stop running until called to run again by the controller 124, such as following initialization of the controller 124 after an offline period. Alternatively, if there is available time and computational throughput, the method 300 may repeat to confirm the starting temperatures determined on the initial loop.

Where the method 300 determines temperatures at iterations over a number of iterative periods, n, the method 300 could immediately loop to find the temperature change over the next iterative period. For example, as illustrated in FIG. 2B, the method 300 may have three sequential loops to determine temperature change occurring from time t1 to time k1; from time k1 to time k2; and from time k2 to time t2.

The detailed description and the drawings or figures are supportive and descriptive of the invention, but the scope of the invention is defined solely by the claims. While the best mode, if known, and other embodiments for carrying out the claimed invention have been described in detail, various alternative designs and embodiments exist for practicing the invention defined in the appended claims.

The invention claimed is:

1. A method of modeling initial temperatures of a dry dual clutch transmission following an offline period of a transmission control module (TCM) lasting from a first clock time to a second clock time, the method comprising:

reactivating the TCM at the second clock time;

calculating a time lapse between the first clock time and the second clock time;

reading last known temperatures of a first component and a second component, wherein the respective last known temperatures occurred at, or just prior to, the first clock time;

calculating a first temperature difference between the last known temperature of the first component and the last known temperature of the second component;

loading a first predefined exponential function, wherein the first predefined exponential function relates temperature differences between the first component and the second component as a function of time;

calculating a first stop time on the first predefined exponential function based upon the calculated temperature difference, wherein the first stop time normalizes the first clock time relative to the first predefined exponential function;

calculating a first start time on the first predefined exponential function from the calculated time lapse and the calculated first stop time, wherein the first start time normalizes the second clock time relative to the first predefined exponential function;

calculating a first conductive heat transfer between the first component and the second component, wherein calculating the first conductive heat transfer includes integrating the first predefined exponential function between the first stop time and the first start time;

calculating a first conductive temperature change between the first component and the second component based upon the calculated first conductive heat transfer;

calculating a starting temperature of the first component from the calculated first conductive temperature change; and executing a control action on the dry dual clutch transmission based upon the starting temperature of the first component.

2. The method of claim 1, further comprising:

reading a last known temperature of a third component;

calculating a second temperature difference between the last known temperature of the third component and the last known temperature of the second component;

loading a second predefined exponential function, wherein the second predefined exponential function relates temperature differences between the third component and the second component as a function of variable time;

calculating a second stop time on the second predefined exponential function based upon the calculated second temperature difference, wherein the second stop time normalizes the second clock time relative to the second predefined exponential function;

calculating a second start time on the second predefined exponential function from the calculated time lapse and the calculated second stop time, wherein the second start time normalizes the second clock time relative to the second predefined exponential function;

calculating a second conductive heat transfer between the third component and the second component, wherein calculating the conductive heat transfer includes integrating the second predefined exponential function between the second stop time and the second start time;

calculating a second conductive temperature change between the third component and the second component based upon the calculated second conductive heat transfer;

calculating a starting temperature of the third component from the calculated second conductive temperature change; and executing a control action on the dry dual clutch transmission based upon the starting temperature of the third component.

3. The method of claim 2, further comprising:

calculating a third temperature difference between the last known temperature of the third component and the last known temperature of the first component;

loading a third predefined exponential function, wherein the third predefined exponential function relates temperature differences between the third component and the first component as a function of variable time;

calculating a third conductive heat transfer between the third component and the first component, wherein calculating the conductive heat transfer includes integrating the third predefined exponential function between the stop time and the start time;

calculating a third conductive temperature change between the third component and the first component based upon the calculated third conductive heat transfer; and wherein calculating the starting temperature of the first component includes summing the calculated first conductive temperature change between the first component and the second component with the calculated third conductive temperature change between the third component and the first component.

4. The method of claim 3, further comprising:

determining a housing case temperature;

setting a housing air temperature equivalent to the housing case temperature;

calculating a first convective heat coefficient for the first component, wherein calculating the first convective heat coefficient includes determining a first heat transfer coefficient based upon a look-up function relating temperature difference between the first component and the housing air temperature;

calculating a first convective heat transfer between the first component and the housing air from the first convective heat coefficient and time lapse between the first clock time and the second clock time;

calculating a first convective temperature change between the first component and the housing air based upon the calculated first convective heat transfer; and wherein calculating the starting temperature of the first component further includes the calculated first convective temperature change.

5. The method of claim 4, further comprising:

comparing the last known temperature of the first component and the second component;

if the last known temperature of the first component is greater than the last known temperature of the second component, loading the first exponential function; and if the last known temperature of the second component is greater than the last known temperature of the first component, loading the third exponential function, different from the first exponential function, wherein calculating the first conductive heat transfer includes integrating the third exponential function between the stop time and the start time.

6. A vehicle powertrain comprising:

an internal combustion engine;

a dry dual clutch mechanism receiving torque from the internal combustion engine;

a gearbox receiving torque selectively provided by the dry dual clutch mechanism; and a controller having a processor and tangible, non-transitory memory on which is recorded instructions for controlling the dry dual clutch mechanism to selectively provide torque to the gearbox, wherein the controller experiences offline periods and online periods, and wherein the controller is programmed to:

store last known temperatures of a first component and a second component of the dry dual clutch mechanism;

deactivate for an offline period lasting from a first clock time to a second clock time, wherein the stored last known temperatures occurred at, or just prior to, the first clock time;

reactivate at the second clock time;

calculate a time lapse between the first clock time and the second clock time;

calculate a first temperature difference between the last known temperature of the first component and the last known temperature of the second component;

load a first predefined exponential function, wherein the first predefined exponential function relates temperature differences between the first component and the second component as a function of time;

determine a first stop time on the first predefined exponential function based upon the calculated first temperature difference, wherein the first stop time normalizes the first clock time relative to the first predefined exponential function;

calculate a first start time on the first predefined exponential function from the calculated time lapse and the determined first stop time, wherein the first start time normalizes the second clock time relative to the first predefined exponential function;

calculate a first conductive heat transfer between the first component and the second component, wherein calculating the first conductive heat transfer includes integrating the first predefined exponential function between the first stop time and the first start time;

calculate a first conductive temperature change between the first component and the second component based upon the calculated first conductive heat transfer;

calculate a starting temperature of the first component from the calculated first conductive temperature change; and control the dry dual clutch transmission based upon the starting temperature of the first component.

7. The vehicle powertrain of claim 6, wherein the controller is further programmed to:

calculate a second conductive heat transfer between the second component and the first component, wherein calculating the second conductive heat transfer includes integrating the first predefined exponential function between the first stop time and the first start time;

calculate a second conductive temperature change between the second component and the first component based upon the calculated second conductive heat transfer;

calculate a starting temperature of the second component from the calculated second conductive temperature change; and control the dry dual clutch transmission based upon the calculated starting temperature of the second component and the calculated starting temperature of the first component.

8. A method of controlling a dry dual clutch transmission, comprising:

reading last known temperatures of a first component and a second component following an offline period of a controller of the dry dual clutch transmission;

calculating a time lapse of the offline period;

calculating a first temperature difference between the last known temperature of the first component and the last known temperature of the second component;

loading a first predefined exponential function, wherein the first predefined exponential function relates temperature differences between the first component and the second component as a function of time;

calculating a first conductive heat transfer between the first component and the second component over the offline period using the first predefined function;

calculating a starting temperature of the first component from the calculated first conductive heat transfer between the first component and the second component;

controlling a clutch-apply pressure of the dry dual clutch transmission based upon the calculated starting temperature of the first component and the second component.

9. The method of claim 8, further comprising:

calculating a starting temperature of the second component from the calculated first conductive heat transfer between the first component and the second component; and controlling the clutch-apply pressure of the dry dual clutch transmission based upon both the starting temperature of the second component and the starting temperature of the first component.

10. The method of claim 9, further comprising:

calculating a first stop time on the first predefined exponential function based upon the calculated first temperature difference, wherein the first stop time normalizes the first clock time relative to the first predefined exponential function;

calculating a first start time on the first predefined exponential function from the calculated time lapse and the calculated first stop time, wherein the first start time normalizes the second clock time relative to the first predefined exponential function; and wherein calculating the first conductive heat transfer includes integrating the first predefined exponential function between the first stop time and the first start time.

\* \* \* \* \*